(12) United States Patent
Tajima et al.

(10) Patent No.: US 8,225,546 B2
(45) Date of Patent: Jul. 24, 2012

(54) PLANT CULTIVATION STRUCTURE, ROOT-PREVENTING STRUCTURE AND ROOT-PREVENTING SHEET USED IN THEM

(75) Inventors: Kunio Tajima, Tokyo (JP); Toru Kojima, Tokyo (JP); Akihiro Sakamoto, Tokyo (JP); Yoshiaki Gotou, Tokyo (JP)

(73) Assignee: Tajima Ryokka Incorporated, Tokyo (JP)

( * ) Notice: Subject to any disclaimer, the term of this patent is extended or adjusted under 35 U.S.C. 154(b) by 250 days.

(21) Appl. No.: 11/981,254

(22) Filed: Oct. 30, 2007

(65) Prior Publication Data
US 2008/0307701 A1   Dec. 18, 2008

(30) Foreign Application Priority Data
Jun. 12, 2007   (JP) ................................ 2007-154714

(51) Int. Cl.
*A01G 13/02* (2006.01)
(52) U.S. Cl. ................................ 47/32.7; 47/65.9; 47/56
(58) Field of Classification Search .................... 47/65.9, 47/32, 32.7, 56, 9, 20.1; *A01G 9/00, 9/02, A01G 13/00, 13/02*
See application file for complete search history.

(56) References Cited

U.S. PATENT DOCUMENTS

| | | | | |
|---|---|---|---|---|
| 4,141,187 A | * | 2/1979 | Graves | 52/173.1 |
| 4,658,554 A | * | 4/1987 | Riley et al. | 52/309.8 |
| 5,287,650 A | * | 2/1994 | Moriguchi et al. | 47/59 R |
| 5,981,030 A | * | 11/1999 | Haupt et al. | 428/143 |
| 6,235,365 B1 | * | 5/2001 | Schaughency et al. | 428/40.1 |
| 7,267,735 B2 | * | 9/2007 | Chang | 156/71 |
| 2003/0054127 A1 | * | 3/2003 | Heifetz | 428/40.1 |
| 2007/0079547 A1 | * | 4/2007 | Gold | 47/18 |
| 2009/0158652 A1 | * | 6/2009 | Yoshida et al. | 47/65.9 |

FOREIGN PATENT DOCUMENTS
EP   477514 B1 *   8/1993
(Continued)

OTHER PUBLICATIONS
English translation of JP02310046A—see attached.*
(Continued)

*Primary Examiner* — David Parsley
*Assistant Examiner* — Marisa Conlon
(74) *Attorney, Agent, or Firm* — Lipsitz & McAllister, LLC

(57) ABSTRACT

To realize a root-preventing sheet with outstanding shape maintaining properties while being thin and light that even when affixed has no wrinkles, is difficult to tear, has excellent applicability, durability and adhesiveness and demonstrates definite root-preventing effects at low cost. The above problem is resolved by realizing a root-preventing layer structure set up on the construction surface of the soil layer that the plant is planted in and which prevents extrusion into the outer part of the soil layer of the plant root comprising: a resin film having the strength to be able to prevent extrusion of the plant root affixed to the construction surface; and an adhesive layer formed on the back face of the resin film, wherein a cover tape, which has an adhesive layer on the back face and has enough strength to be able to prevent extrusion of the plant root, is affixed to mutually abutting or overlapping resin film parts of the root-preventing layer to prevent extrusion of the plant root, and the thickness of the adhesive layer of the cover tape is formed to be smaller than the diameter of the extruding tip of the plant root.

14 Claims, 6 Drawing Sheets

FOREIGN PATENT DOCUMENTS

| | | |
|---|---|---|
| JP | 11-32578 | 5/1989 |
| JP | 02310046 A * | 12/1990 |
| JP | 2001-178269 | 7/2001 |
| JP | 2002-335762 | 11/2002 |
| JP | 2005-58178 | 3/2005 |
| JP | 2006-161484 | 6/2006 |
| JP | 2006-180764 | 7/2006 |
| JP | 2006-204190 | 8/2006 |
| JP | 2006-230355 | 9/2006 |
| JP | 2007-6798 | 1/2007 |
| JP | 2007-20464 | 2/2007 |
| JP | 2007-49957 | 3/2007 |
| WO | WO2007069395 * | 6/2007 |

OTHER PUBLICATIONS

English translation of EP0477514B1—see attached.*
English translation generated Feb. 3, 2011 of JP02310046A (Dec. 1990)—attached to OA mailed Feb. 10, 2011.*
English translation generated Feb. 3, 2011 of EP477514B1 (Aug. 1993)—attached to OA mailed Feb. 10, 2011.*

* cited by examiner

PLANT CULTIVATION STRUCTURE, ROOT-PREVENTING STRUCTURE AND ROOT-PREVENTING SHEET USED IN THEM

BACKGROUND OF THE INVENTION

1. Field of the Invention

This invention relates to root prevention technology for preventing extrusion of plant roots into the outside part of the soil layer and particularly relates to insufficient prevention of other waterproof functions for buildings and to building damage prevention.

2. Description of the Related Art

In recent years there have been active attempts to cultivate plants on a large scale on building rooftops or other spaces, to plant trees in inorganic spaces in urban areas, to make views more beautiful and to suppress the heat island phenomenon. However, because the expansion capability of plant roots is so powerful, they have extruded into the inner waterproof layers of concrete foundations and asphalt.

As a result, cracks have been caused in buildings, roads and underground pipelines which have lead to a number of problems. For example, when growing trees on rooftops, it is easy for the plant roots to get into the waterproof layer made of asphalt and to cause leakage problems. Also, when cultivating trees for lining the shoulders of outdoor roads, the roots of these trees get in sewage pipes from the joints and cause blockage problems.

Consequently, root prevention countermeasures have been applied for quite some time. For example, there have been instances where such materials as woven cloth or nonwoven fabric with chemical root-preventing treatment applied have been laid underneath root cultivation layers. However, there are also cases where the root-preventing treatment agents cause damage to the growth of the plant roots, debilitating effects cannot be avoided over the years and initial costs are high.

Furthermore, attempts to build plastic sheets as root-preventing countermeasures have also been made. However, without making an analysis of the root-preventing functions of plastic sheets, in certain cases it has frequently happened that the sheets have been too thick and this has caused problems in application or conversely when they have been too thin, no root prevention results have been obtained. Additionally, there has been the problem of plant roots extruding from the overlapping parts of the sheets. In order to prevent this from occurring from the overlapping parts, attempts have also been made to provide root prevention treatment to the overlapping parts but manufacturing costs have increased and application has been very troublesome and inconvenient.

Furthermore, the following are references pertaining to this invention

[Patent document No. 1] Japanese Published Unexamined Application Publication No. 2007-49957
[Patent document No. 2] Japanese Published Unexamined Application Publication No. 2007-20464
[Patent document No. 3] Japanese Published Unexamined Application Publication No. 2007-6798
[Patent document No. 4] Japanese Published Unexamined Application Publication No. 2006-230355
[Patent document No. 5] Japanese Published Unexamined Application Publication No. 2006-204190
[Patent document No. 6] Japanese Published Unexamined Application Publication No. 2006-180746
[Patent document No. 7] Japanese Published Unexamined Application Publication No.
[Patent document No. 8] Japanese Published Unexamined Application Publication No. 2005-58178
[Patent document No. 9] Japanese Published Unexamined Application Publication No. 2002-335762
[Patent document No. 10] Japanese Published Unexamined Application Publication No. 2001-178269
[Patent document No. 11] Japanese Published Unexamined Application Publication No. 11-32578

The objective of this invention is to solve the above-mentioned conventional problems by achieving root prevention technology to present definite root-preventing effectiveness at low initial cost with easy, stable application and with outstanding durability.

SUMMARY OF THE INVENTION

This invention is intended to solve the above-mentioned problems by providing:

a plant cultivation structure formed on roofs, rooftops and the like of buildings, comprising:
  a waterproof layer set up on the foundation thereof;
  a roof-preventing layer formed on the waterproof layer to prevent extrusion of the plant root into the root-preventing layer; and
  a soil layer formed on this root-preventing layer for cultivating plants,
wherein, the root-preventing layer is configured with;
  a resin film having the strength to be able to prevent extrusion of the plant root; and
  an adhesive layer formed on the back face of the resin film, wherein a cover tape, which has an adhesive layer on the back face and has enough strength to be able to prevent extrusion of the plant root, is affixed to mutually abutting or overlapping resin film parts of the root-preventing layer to prevent extrusion of the plant root, and
the thickness of the adhesive layer of the cover tape is formed to be smaller than the diameter of the extruding tip of the plant root.

This invention is also intended to solve the above-mentioned problems by providing a plant cultivation structure formed on roofs, rooftops, or the like of buildings, comprising:
  a waterproof layer set up on the foundation thereof;
  a roof-preventing layer formed on the waterproof layer to prevent extrusion of the plant root into the root-preventing layer; and
  a soil layer formed on this root-preventing layer for cultivating plants,
wherein, the root-preventing layer is configured with;
  a resin film having the strength to be able to prevent extrusion of the plant root, and
  an adhesive layer formed on the back face of the resin film; and the thickness of the adhesive layer of the cover tape is formed to be smaller than the diameter of the extruding tip of the plant root.

Additionally, in the embodiment of the plant cultivation structure above, in order to further strengthen the extrusion prevention of the plant root,
a cover tape, which has an adhesive layer on the back face and has enough strength to be able to prevent extrusion of the plant root, is affixed to mutually abutting or overlapping resin film parts of the root-preventing layer to prevent extrusion of the plant root, and the thickness of the adhesive layer of the cover tape may be configured to be smaller than the diameter of the extruding tip of the plant root.

Furthermore, in any of the above plant cultivation structures,
the root-preventing layer may comprise:
a resin film having the strength to be able to prevent extrusion of the plant root;
an adhesive layer formed on the back face of the resin film; and
a resin film reinforcing member interposed between the resin film and the adhesive layer,
wherein, the thickness of the adhesive layer may be configured to be smaller than the diameter of the extruding tip of the plant root.

Also, the reinforcing member of the plant cultivation structure discussed above may be composed of nonwoven fabric and/or a resin material and/or a rubber material and/or asphalt.

Further, in any of the above-mentioned plant cultivation structures a film surface may be formed on the surface of the resin film comprising the root-preventing layer in order to improve adhesiveness, weatherability and strength.

Additionally, the film surface of the plant cultivation structure discussed above may be formed of paint that includes a fluorine resin or an acrylic silicon system resin for weatherability and is formed of paint that includes a urethane system resin that confers adhesiveness.

This invention also intend to solve the above-mentioned problems by realizing a root-preventing layer structure set up on the construction surface of the soil layer that the plant is planted in and which prevents extrusion into the outer part of the soil layer of the plant root comprising:
a resin film having the strength to be able to prevent extrusion of the plant root affixed to the construction surface, and
an adhesive layer formed on the back face of the resin film, wherein
a cover tape, which has an adhesive layer on the back face and has enough strength to be able to prevent extrusion of the plant root, is affixed to mutually abutting or overlapping resin film parts of the root-preventing layer to prevent extrusion of the plant root, and the thickness of the adhesive layer of the cover tape is formed to be smaller than the diameter of the extruding tip of the plant root.

Furthermore, this invention intend to solve the above-mentioned problems by realizing a root-preventing layer structure set up on the construction surface of the soil layer that the plant is planted in and which prevents extrusion into the outer part of the soil layer of the plant root comprising:
a resin film having the strength to be able to prevent extrusion of the plant root affixed to the construction surface, and
an adhesive layer formed on the back face of the resin film, wherein
the thickness of the adhesive layer of the cover tape is formed to be smaller than the diameter of the extruding tip of the plant root.

In addition, in the root-preventing layer structure discussed above, a cover tape, which has an adhesive layer on the back face and has enough strength to be able to prevent extrusion of the plant root, is affixed to mutually abutting or overlapping resin film parts of the root-preventing layer to prevent extrusion of the plant root, and the thickness of the adhesive layer of the cover tape is formed to be smaller than the diameter of the extruding tip of the plant root.

Also, in any of the above-mentioned root-preventing layer structures, a resin film reinforcing member may be interposed between the resin film and its adhesive layer, and the thickness of the adhesive layer is formed to be smaller than the diameter of the extruding tip of the plant root.

The reinforcing member in the root-preventing layer structure discussed above may be formed by nonwoven fabric and/or a resin material and/or a rubber material and/or asphalt.

Furthermore, any of the above-mentioned root-preventing layer structures may have film surface formed on the surface of the resin film in order to improve adhesiveness, weatherability and strength.

Also, in the root-preventing layer structure discussed above, the film surface may be formed of paint that includes a fluorine resin or an acrylic silicon system resin for weatherability or formed of paint that includes a urethane system resin that confers adhesiveness.

This invention also intends to solve the above-mentioned problems by providing a root-preventing sheet for blocking extrusion of the plant root comprising;
a resin film which has enough strength to be able to prevent extrusion of the plant root and is affixed to the construction surface, and
an adhesive layer formed on the back face of the resin film, wherein
the thickness of the adhesive layer is formed to be smaller than the diameter of the extruding tip of the plant root.

Furthermore, in the above-described root-preventing materials, a resin film reinforcing member may be interposed between the resin film and its adhesive layer, and the thickness of the adhesive layer is formed to be smaller than the diameter of the extruding tip of the plant root.

Additionally, the reinforcing member in the above-mentioned root-preventing sheet may be composed of nonwoven fabric and/or a resin material and/or a rubber material and/or asphalt.

Further, any of the above-mentioned root-preventing sheets may have a film surface formed on the surface of the resin film in order to improve adhesiveness, weatherability and strength.

In the above-mentioned sheets, the film surface may be formed of paint that includes a fluorine resin or an acrylic silicon system resin for weatherability or formed of paint that includes a urethane system resin that confers adhesiveness.

In accordance with the above structure, this invention can provide a root-preventing sheet that maintains its shape superlatively in spite of its thinness and lightness, and when affixed does not wrinkle, is difficult to tear, has excellent applicability, is highly durable, has outstanding adhesiveness, can be easily anchored to many different materials, has low initial cost and demonstrates definite root-preventing effects and as a result, definite root-preventing effects can be achieved with a high applicability rate when constructing plant cultivation structures and various types of root-preventing structures.

DETAILED DESCRIPTION OF THE PREFERRED EMBODIMENTS

Figure 1:
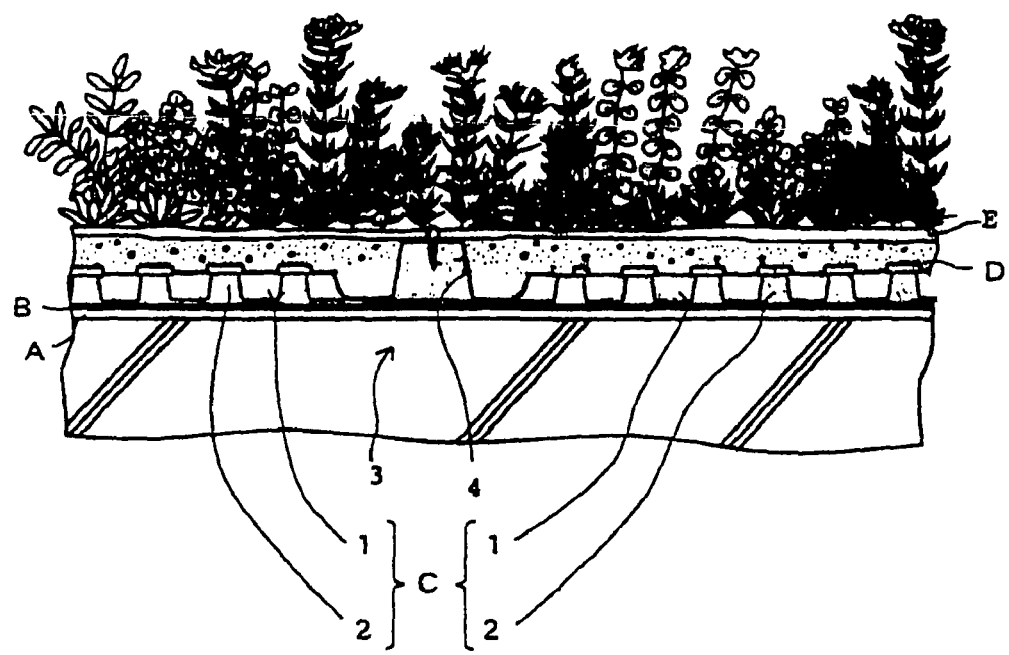
FIG. 1 A partial notch longitudinal section showing an embodiment of the plant cultivation structure relating to this invention.

The root-preventing sheet is formed of various types of resin films, has an adhesive layer on the back and can easily and strongly be affixed to the waterproof layer of buildings. Polyethylene terephthalate (PET), polyethylene, polypropylene, nylon and vinyl chloride are ideally suited as resins composing the film.

It is essential for resin films to have a fixed strength in order to block extrusion of plant roots and when considering applicability, transportability and economic efficiency, a thin material is preferred as much as possible. Through analysis of experimental results, the authors of this invention have found suitable film thicknesses necessary to have the required performance. It has been determined that the preferred thicknesses are approximately 75 microns for polyethylene terephthalate (PET), approximately 300 microns for polyethylene and approximately 100 microns for polypropylene.

The root-preventing sheet is usually affixed to the waterproof layer of the rooftops of buildings, has the plant soil layer formed on it and should be used to prevent extrusion of the plant roots into the waterproof layer. When affixed, adjacent parts are superimposed and there is the possibility that the plant roots will extrude from the adhesive layer of the overlapping parts. However, the diameter of the tip part of the plant root is generally 40 to 50 microns. As a result, if the thickness of the adhesive material layer on the back of the resin film is set up to be on the order of 30 microns, it is possible to prevent invasion from the adhesive layer of the resin film overlapping parts.

From the viewpoint of economic viability, transportability or easy roll up, it is preferable if the resin film is thin. If it is too thin, problems arise in applicability and strength. That is, if it is too thin, the concerns are that it will be difficult for it to maintain its shape when applied, it will become wrinkled when affixed and the film will tear.

Consequently, reinforcing member is interposed between the back of this resin film and the adhesive layer formed here. This reinforcing member is formed of nonwoven fabric and/or a resin material and/or a rubber material and/or asphalt.

A film surface is formed on the surface of the resin film that comprises the root-preventing layer so as to improve adhesiveness, weatherability and strength. Depending on the quality of the resin, it is difficult for adhesive agents to act on an unprocessed surface of resin film surfaces and as a result the film surface which imparts adhesiveness is formed by painting the surface of this resin film and it becomes possible to make effective use of adhesive agents at various places.

Additionally, the root-preventing sheet usually has the plant cultivation layer, which is blocked from the open air and ultraviolet rays, placed on its upper part and because, depending on circumstances, a part may also be exposed requiring a further certain amount of time until construction at the application site and the constructed and exposed surface will have to be left as it is for a fixed amount of time, weatherability is essential. Furthermore, by forming a film surface by painting the surface, the film strength is increased and the application operation is easy to perform. Paints which include fluorine resin or acrylic silicon system resin or urethane system resin are all appropriate as coatings for forming the film surface.

That is, the fluorine resin or acrylic silicon system resin contributes to weatherability and the urethane system resin to adhesiveness.

The above-described root-preventing sheet is preferably applied to planting trees on rooftops. Up to the present time various types of plant cultivation devices have been provided for tree planting on rooftops but any basic structure should have a soil layer formed that has the plants on the building foundation waterproofing layer with the root-preventing layer formed between the soil layer and the foundation waterproofing layer.

Nevertheless, that there are inconveniences in root-preventing structures in plant cultivation structures formed on roofs and rooftops of conventional buildings has been described above, but by adopting the root-preventing sheet pertaining to this invention, it is possible to achieve a plant cultivation structure that has superlative root-preventing effects.

That is, the plant cultivation structure comprises a waterproof layer set up on the foundation thereof; a roof-preventing layer formed on the waterproof layer to prevent extrusion of the plant root into the root-preventing layer; and a soil layer formed on this root-preventing layer for cultivating plants, wherein, the root-preventing layer is configured with;

a resin film having the strength to be able to prevent extrusion of the plant root, and an adhesive layer formed on the back face of the resin film, and the thickness of the adhesive layer of the cover tape is formed to be smaller than the diameter of the extruding tip of the plant root. Of course the plant roots are in contact with the overlapping parts of the resin film and because of their powerful pressing force, it is necessary to make the thickness of the resin film as thin as possible so that the plant roots do not come in contact with the overlapping parts. If it is made too thin, the root-preventing strength will be insufficient. Consequently, it is necessary to strike a balance between demands for thinness and strength.

The specific critical values set for this thickness for various types of resin films have already been described previously from experiments for this invention.

However, when constructing the resin film over a wide area, because of the action on the resin of the pressing force of the plant roots and other types of forces on the overlapping parts or on the mutually abutting parts of the film, it is preferable to reinforce these components. Consequently, a cover tape having an adhesive layer on the back with the strength to be able to prevent extrusion of the plant root is affixed to the overlapping parts of the resin film or the mutually adjacent parts of the film in order to reinforce the strength of the overlapping parts or the mutually adjacent parts of the resin film. This tape reinforces the strength of the overlapping parts. However, depending on the thickness of the adhesive layer of the resinous tape, because of intrusion of the tips of the plant roots from here, it is necessary to make the thickness of the adhesive layer smaller than the diameter of the extruding tip of the plant root and at the present time it is necessary to set the thickness of the adhesive layer at on the order of 30 microns for making the diameter of the adhesive layer smaller than the extruding tip of the plant root. To avoid impinging of the plant roots on the overlapping parts of the resin film and to allow them to be directed to the upper side of the overlapping parts with the cover tape, something somewhat smaller than the resin film is preferred and the resin is formed of something similar to the resin film. Furthermore, when the thickness of the adhesive layer of the resin film is so formed as to be smaller than the diameter of the extruding tip of the plant root, cover tape is not necessarily required but by using the cover tape the extruding prevention function for the plant roots is further enhanced.

The root-preventing sheet is not limited just to planting trees on rooftops but can be used in root-preventing structures when artificial cultivation devices and other types of root prevention are extensively required. That is, this type of root-preventing layer structure is composed of a resin film set up on the construction surface of the soil layer (planting layer, plant cultivation layer) on which plants will seeded having the strength to be able to prevent extrusion of the plant roots and which is affixed to the construction surface and an adhesive layer formed on the back of this resin film.

The plant roots are, of course, in contact with the overlapping parts of the resin film and because of their powerful pressing force, the thickness of the resin film must be made as thin as possible so that the plant roots do not connect with the overlapping parts. If it is made too thin, there will not be sufficient strength for preventing roots. Consequently, it is necessary to strike a balance between demands for thinness and strength. The establishment of specific critical values for the thicknesses of this invention depending on the various types of resin films and derived from experiment has already been described above.

However, because there are other types of forces at play beside the pressing force of the plant roots on the overlapping parts of the resin film, it is preferable if this part is reinforced. As a result, the overlapping parts of the resin film on the root-preventing layer are covered with resinous tape having an adhesive layer on the back which reinforces the strength of the overlapping parts. However, because, depending on the thickness of the adhesive layer of the resinous tape, the tip of the plant root will penetrate from this part, the thickness of the adhesive layer must be set up at on the order of 30 microns. Because the intent with the cover tape is to avoid colliding with the plant root overlapping parts of the resin film and to direct the roots to the upper part of the overlapping parts, something somewhat thinner than the resin film is desired and the resin is formed with something similar to the resin film.

An explanation of an embodiment of this invention is given below based on the figures. FIG. 1 is a figure of a longitudinal section of an embodiment of the plant cultivation structure pertaining to this invention.

In the diagram, A is the waterproof layer affixed to the concrete slab surface of the rooftop of a building and the root-preventing layer B is spread over the upper surface of this waterproof layer A to prevent the hair roots of the plant from penetrating the waterproof layer. This root-preventing layer B is comprised of a resin film having the strength to be able to prevent extrusion of the plant roots and an adhesive layer formed on the back surface of this resin film and is so constructed that the thickness of the adhesive layer is smaller than the diameter of the extruding tip of the plant root.

Furthermore, if a cover tape to be described later is affixed to the overlapping parts of this resin film, even if the thickness of the adhesive layer is not formed so as to be smaller than the diameter of the extruding tip of the plant root, it is still possible to prevent extrusion of the plant roots from the overlapping parts but this will be described subsequently.

C is a resin or metal water supply/drainage foundation provided as a water retention/supply/drainage means and is formed over the entire surface by a numerously integrated water retention part 1 and a water drainage part 2. Each soil layer D in which the various plants grow is layered and built up on the upper part of the supply/drainage foundation C with a windbreaking net E on its surface. The supply/drainage foundation C, in addition to having a water retention part 1 and a water drainage part 2 numerously formed as an integrated unit, is comprised of a fitting means 3 for the windbreaking net E which is comprised of an opening formed on the bottom part of the water supply/drainage foundation C, a hollow body 4 fitted into this opening and its bracket part. The windbreaking net E is confined to the waterproof layer A of the rooftop slab surface through the fitting means 3.

Figure 2:
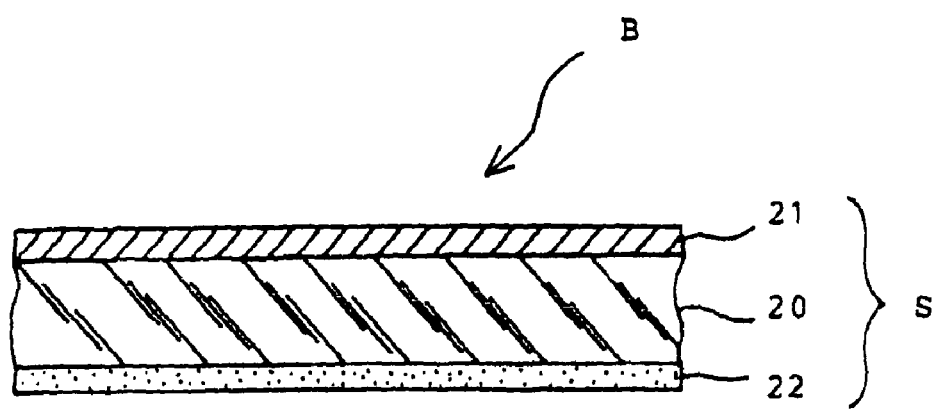
FIG. 2 A partial notch longitudinal section of the root-preventing sheet S composed of the root-preventing layer B.
Figure 3:
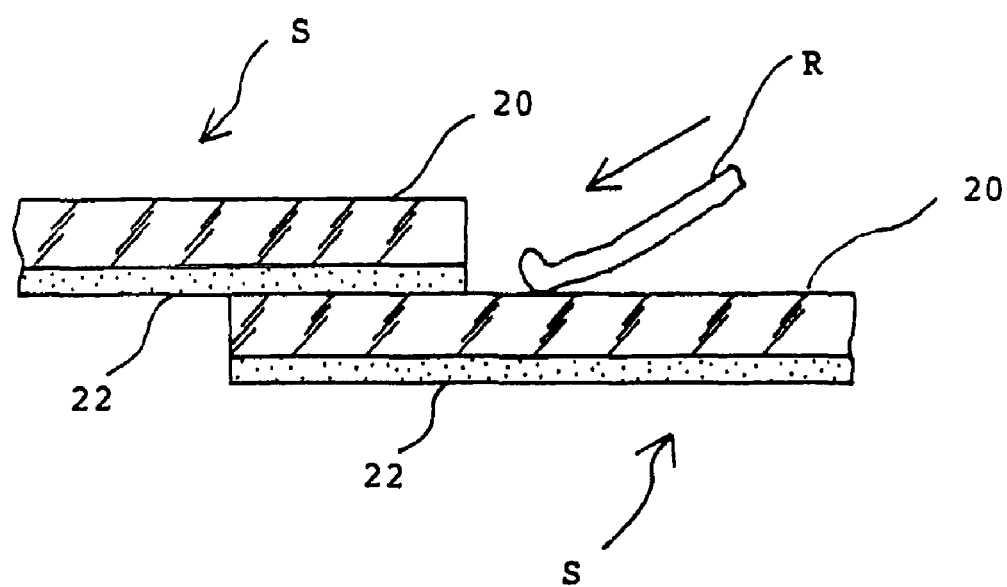
FIG. 3 A cross sectional diagram showing the intrusion state of the plant roots in the mutually overlapping parts of the root-preventing sheet S.

FIG. 2 is part of the notch longitudinal section of the root-preventing sheet S composing the root-preventing layer B. The root-preventing sheet S is composed of a resin film 20 having the strength to be able to prevent extrusion of the plant root, a film surface 21 formed on its surface and an adhesive layer 22 formed on the back of the resin film and the thickness of the adhesive layer 22 is set at 30 microns which is smaller than the diameter of the tip of the plant root and is intended to prevent penetration of the plant root. That is, as shown in FIG. 3, penetration of the tip of the plant root R into the mutually overlapping part of the root-preventing sheet S is in its normal state. However, in this invention, because the adhesive layer 22 of the resin film 20 is set at 30 microns and is smaller than the diameter of the tip of the plant root R, the tip of the plant root R is in the overlapping part and is in total contact with the edge of the resin film 20 and penetration into the adhesive layer 22 is completely impeded. Furthermore, the tip parts of the roots of plants used in tree planting on rooftops are normally massively formed and their diameters are much larger than 30 microns.

Additionally, in FIG. 2 the film surface 21 is designed to improve the adhesiveness of the surface of the resin film, various types of devices easily adhere to it because of the adhesive agent, constructing plant cultivation devices is easily done, weatherability of the resin film is increased and even if the surface is exposed to ultraviolet rays, it does not degrade easily. Furthermore, it is also effective at preventing cracks in the resin film. For this embodiment, an acrylic urethane system paint was used as the paint forming the surface.

Figure 4:
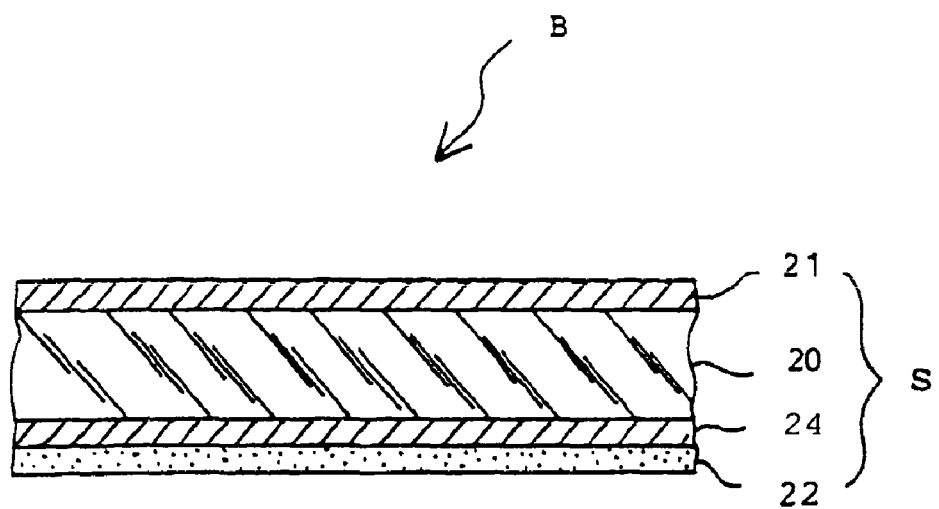
FIG. 4 A partial notch longitudinal section showing another embodiment of the root-preventing sheet S.

FIG. 4 is part of the notch longitudinal section showing another embodiment of the root-preventing sheet S. In this embodiment, reinforcing member 24 is interposed between the resin film 20 and its adhesive layer 22 which, in addition to maintaining the strength of the root-preventing sheet S, preventing rupturing, increasing maintainability of the shape of the film at application time, and preventing wrinkles, also makes application itself an easy process.

A mesh material made of nonwoven fabric containing, for example, glass fibers, and a rubber material or asphalt are used as the reinforcing member.

Figure 5:
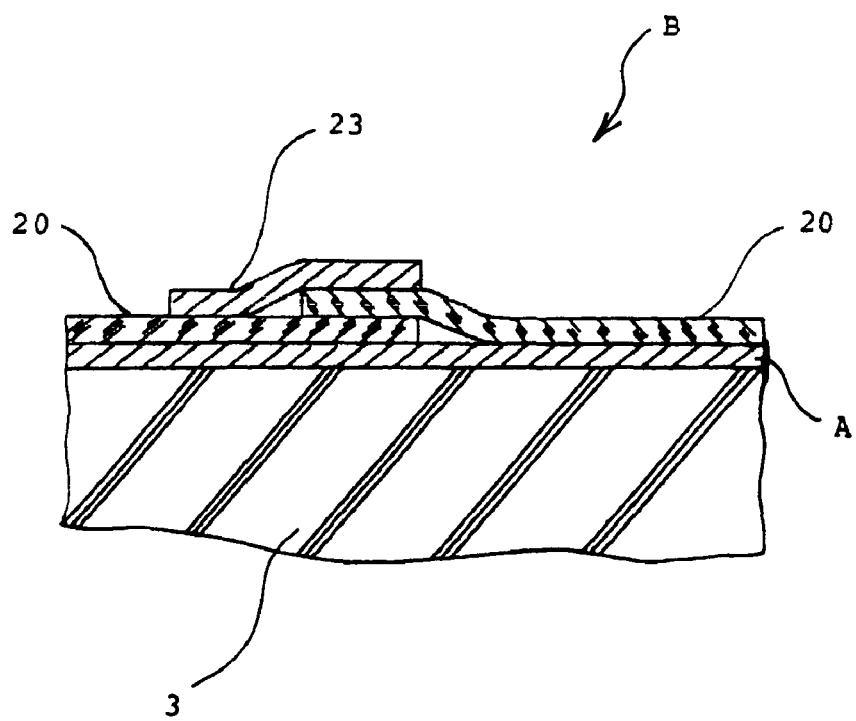
FIG. 5 A partial notch longitudinal section showing an embodiment of the structure in the overlapping part of the resin film 20.
Figure 6:
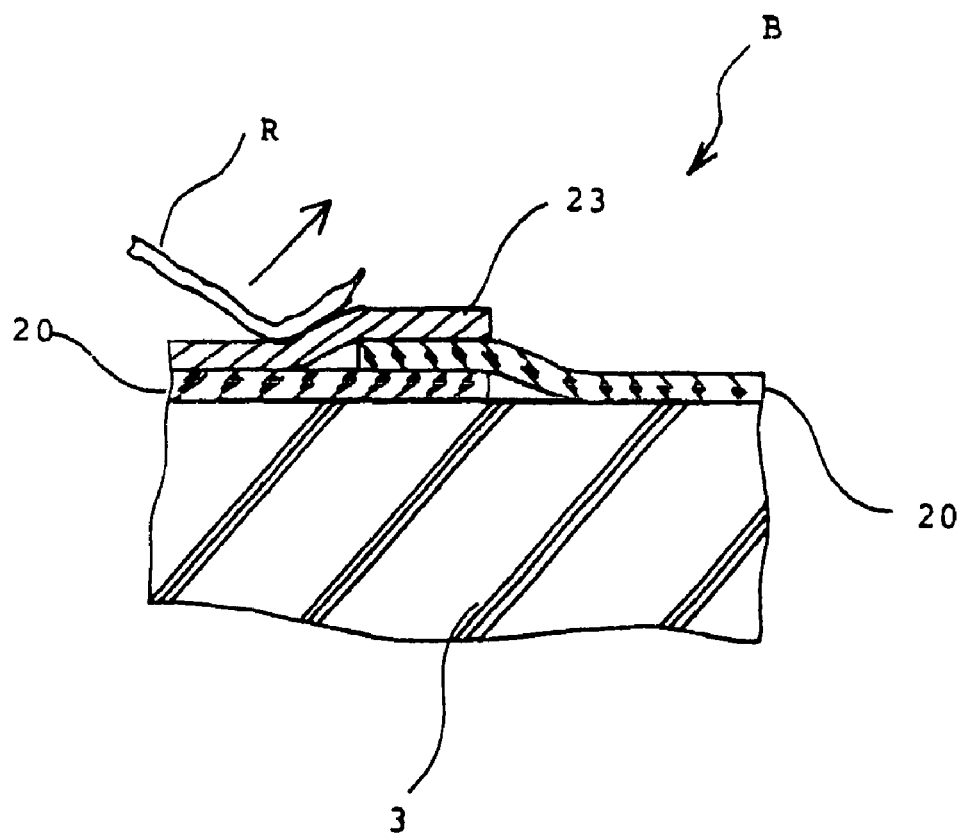
FIG. 6 An explanatory diagram showing the direction of the tip of the plant root R in the overlapping part of the resin film 20.

When numerous pieces of resin film 20 are set up on the construction surface forming the root-preventing layer B, it is necessary to either overlap the end parts of the resin film 20 which are adjacent or tightly adjoin the mutual edge parts of the resin film which are adjacent. FIG. 5 is a partial notch longitudinal section showing an embodiment of the structure in the overlapping part of the resin film 20. In the diagram, 23 is the cover tape affixed to the resin film 20 and the overlapping part of 20 and has an adhesive layer on the back. As shown in FIG. 6, when the cover tape is affixed to the overlapping part, the tip of the plant root R is directed as indicated by the arrow along the resinous tape to the upper part of the overlapping part and impacting on the thick portion in the overlapping part of the resin film 20 is thus avoided. Furthermore, the thickness of the adhesive layer of the cover tape is set at 30 microns. Because this value of 30 microns is smaller than the diameter of the extruding tip of the plant root, the plant root never penetrates from this adhesive layer section. In the embodiment of FIG. 4, the thickness of the adhesive layer of the resin film 20 is set at 30 microns and is so formed as to be smaller than the diameter of the tip of the plant root but when the cover tape 23 is used, even if the thickness of the adhesive layer of the resin film is not necessarily set smaller than the diameter of the extruding tip of the plant root, extrusion of the plant root can be prevented. However, if a resin film is used wherein the thickness of the adhesive layer of the resin film is set smaller than the diameter of the extruding tip of the plant root, the extrusion prevention function of the plant root is further enhanced.

The root-preventing structure pertaining to this invention is set up on the construction surface of the layer the plant is to grow in, that is, in the surrounding area of the plant layer and it will block extrusion of the plant root within a certain space and its use range is exceedingly extensive. This root-preventing layer structure is composed of a root-preventing sheet comprising a resin film affixed to the construction surface having the strength to be able to prevent extrusion of the roots of the plants and an adhesive layer formed on the back face of the resin film and is so formed that the thickness of the adhesive layer is smaller than the extruding tip of the plant root. The root-preventing sheet used is shown in FIGS. 2 and 3. Additionally, the structure of the overlapping part of the root-preventing sheet is similar to the one shown in FIG. 4.

Next, an explanation of a test example concerning the root-preventing performance (strength) of the resin film pertaining to the root-preventing sheet will be given.

Test Example 1

Resin film polyethylene terephthalate (PET)
Plant: Sasa albo-marginata
Test equipment: A waterproof layer was set up on a concrete foundation and the root-preventing structure B with the structure indicated in FIG. 2 was set up above. The resin film layer on the root-preventing sheet had 3 thicknesses: 50 microns, 75 microns and 100 microns. A 20 cm deep soil layer was laid on the root-preventing sheet B with these 3 thicknesses and a Sasa albo-marginata was planted.
Observation period: 2 years
Results: When observations were made after 2 years had passed, it was verified that for the 50 micron thick resin film the roots of the Sasa albo-marginata had extruded between the waterproof layer and the root-preventing layer. For the 75 and 100 micron thick resin films, it was verified that, even after the passage of 2 years, the roots of the Sasa albo-marginata had been blocked by the root-preventing sheet.

Test Example 2

Resin film: polyethylene (PE)
Plant: Sasa albo-marginata
Test equipment: A waterproof layer was set up on a concrete foundation and the root-preventing structure B with the structure indicated in FIG. 2 above was set up. The resin film layer on the root-preventing sheet had 3 thicknesses: 200 microns, 250 microns and 300 microns. A 20 cm deep soil layer was laid on the root-preventing sheet B with these 3 thicknesses and a Sasa albo-marginata was planted.
Results: When observations were made after 2 years had passed, it was verified that for the 200 micron thick resin film the roots of the Sasa albo-marginata had extruded between the waterproof layer and the root-preventing layer. For the 250 micron thick resin film, it was verified that some of the roots had extruded between the waterproof layer and the root-preventing sheet. On the other hand, for the 300 micron thickness, it was verified that the roots of the Sasa albo-marginata had been blocked by the root-preventing sheet.

Test Example 3

Resin film: poly propylene (PP)
Plant: Sasa albo-marginata
Test equipment: A waterproof layer was set up on a concrete foundation and the root-preventing structure B with the structure indicated in FIG. 2 above was set up. The resin film layer on the root-preventing sheet had 3 thicknesses: 50 microns, 75 microns and 100 microns. A 20 cm deep soil layer was laid on the root-preventing sheet B with these 3 thicknesses and a Sasa albo-marginata was planted.
Observation period: 2 years
Results: When observations were made after 2 years had passed, it was verified that for the 50 micron thick resin film the roots of the Sasa albo-marginata had extruded between the waterproof layer and the root-preventing layer. For the 75 micron thickness, it was confirmed that some of the roots had extruded between the waterproof layer and the root-preventing sheet. On the other hand, for the 100 micron thick resin film, it was verified that the roots of the Sasa albo-marginata had been blocked by the root-preventing sheet.

EXPLANATION OF THE SYMBOLS

A . . . waterproof layer
B . . . root-preventing layer
C . . . water supply/drainage foundation
D . . . fertile soil layer
E . . . windbreaking net
R . . . plant root
1 . . . water retention part
2 . . . water drainage part
3 . . . fitting means for the windbreading net E
4 . . . hollow body
20 . . . resin film
21 . . . film surface
22 . . . adhesive layer
23 . . . resinous tape

What is claimed is:
1. A plant cultivation structure for rooftops of buildings, comprising:
 a first layer comprising a waterproof layer arranged directly on top of a rooftop surface;
 a second layer comprising a root-preventing layer formed directly on top of the waterproof layer to prevent extrusion of plant roots into the waterproof layer;
 a third layer comprising a water retention, supply, and drainage structure arranged directly on top of the root-preventing layer, comprising a plurality of integrated water retention parts and water drainage parts; and
 a fourth layer comprising a soil layer for cultivating plants, said soil layer being provided in an upper portion of the water retention, supply, and drainage structure;
 wherein the root-preventing layer consists of:
  a resin film adapted to prevent the extrusion of the plant roots, said resin film having a thickness of between approximately 75 microns and 300 microns,
  a film surface of the resin film abutting the water retention, supply and drainage structure and being formed by a painted-on layer that comprises an acrylic urethane paint adapted to improve adhesiveness, weatherability, and strength of the resin film;

an adhesive layer formed on a back face of the resin film abutting the waterproof layer and having a thickness of approximately 30 microns;

a cover tape, which has an adhesive layer on a back face thereof and is adapted to prevent the extrusion of the plant roots, is affixed to mutually abutting or overlapping parts of the resin film to prevent the extrusion of the plant roots, and a thickness of the adhesive layer of the cover tape is formed to be smaller than a diameter of extruding tips of the plant roots, said thickness being approximately 30 microns.

2. The plant cultivation structure according to claim 1, the root-preventing layer further consisting of:

a resin film reinforcing member interposed directly between the resin film and the adhesive layer, wherein a thickness of the adhesive layer of the resin film is formed to be smaller than the diameter of the extruding tips of the plant roots.

3. The plant cultivation structure according to claim 2, wherein the reinforcing member is made of at least one of nonwoven fabric, a resin material, a rubber material, and asphalt.

4. The plant cultivation structure according to claim 1, further comprising:

a fitting means comprising a hollow body fitted to an opening in the water retention, supply, and drainage structure; and a windbreaking net disposed on a surface of the soil layer adapted to retain the soil layer in place, said windbreaking net being affixed to the waterproof layer through the fitting means.

5. A plant cultivation structure for rooftops of buildings, comprising:

a first layer comprising a waterproof layer arranged directly on top of a rooftop surface;

a second layer comprising a root-preventing layer formed directly on top of the waterproof layer to prevent extrusion of plant roots into the waterproof layer;

a third layer comprising a water retention, supply, and drainage structure arranged directly on top of the root-preventing layer, comprising a plurality of integrated water retention parts and water drainage parts; and a fourth layer comprising a soil layer which allows plants to grow, said soil layer being provided in an upper portion of the water retention, supply, and drainage structure;

wherein the root-preventing layer consists of:

a resin film adapted to prevent the extrusion of plant roots, said resin film having a thickness of between approximately 75 microns and 300 microns;

a film surface of the resin film abutting the water retention, supply and drainage structure and being formed by a painted-on layer that comprises an acrylic urethane paint adapted to improve adhesiveness, weatherability, and strength of the resin film;

an adhesive layer formed on a back face of the resin film abutting the waterproof layer and having a thickness of approximately 30 microns; and a thickness of the adhesive layer is formed to be smaller than a diameter of extruding tips of the plant roots.

6. The plant cultivation structure according to claim 5, wherein a cover tape, which has an adhesive layer on a back face thereof and is adapted to prevent the extrusion of the plant roots, is affixed to mutually abutting or overlapping parts of the resin film to prevent the extrusion of the plant roots, and a thickness of the adhesive layer of the cover tape is formed to be smaller than the diameter of the extruding tips of the plant roots, said thickness being approximately 30 microns.

7. The plant cultivation structure according to claim 5, further comprising:

a fitting means comprising a hollow body fitted to an opening in the water retention, supply, and drainage structure; and a windbreaking net disposed on a surface of the soil layer adapted to retain the soil layer in place, said windbreaking net being affixed to the waterproof layer through the fitting means.

8. A root-preventing layer structure which is set up on a construction surface underneath a soil layer in which plants are planted, the root-preventing layer structure consisting of:

a middle layer comprising a resin film adapted to prevent extrusion of the plant roots, said resin film adapted to be affixed directly to the construction surface and having a thickness of between approximately 75 microns and 300 microns;

a top layer comprising a film surface of the resin film being formed by a painted-on layer that comprises an acrylic urethane paint adapted to improve adhesiveness, weatherability, and strength of the resin film; and a bottom layer comprising an adhesive layer formed on a back face of the resin film for fixing the resin film to the construction surface having a thickness of approximately 30 microns, wherein a cover tape, which has an adhesive layer on a back face thereof and is adapted to prevent the extrusion of the plant roots, is affixed to mutually abutting or overlapping parts of the resin film to prevent the extrusion of the plant roots, and a thickness of the adhesive layer of the cover tape is formed to be smaller than a diameter of extruding tips of the plant roots, said thickness being approximately 30 microns.

9. The root-preventing layer structure of claim 8, further comprising:

a resin film reinforcing member interposed directly between the resin film and the adhesive layer of the resin film, wherein a thickness of the adhesive layer of the resin film is formed to be smaller than the diameter of the extruding tips of the plant roots.

10. The root-preventing layer structure of claim 9, wherein the reinforcing member is made of at least one of nonwoven fabric, a resin material, a rubber material, and asphalt.

11. A root-preventing layer structure which is set up on a construction surface underneath a soil layer in which plants are planted, the root-preventing layer structure consisting of:

a middle layer comprising a resin film adapted to prevent extrusion of the plant roots, said resin film adapted to be affixed directly to the construction surface and having a thickness of between approximately 75 microns and 300 microns;

a top layer comprising a film surface of the resin film being formed by a painted-on layer that comprises an acrylic urethane paint adapted to improve adhesiveness, weatherability, and strength of the resin film; and a bottom layer comprising an adhesive layer formed on a back face of the resin film for fixing the resin film to the construction surface having a thickness of approximately 30 microns;

wherein a thickness of the adhesive layer is formed to be smaller than a diameter of extruding tips of the plant roots.

12. The root-preventing layer structure according to claim 11, wherein a cover tape, which has an adhesive layer on a back face thereof and is adapted to prevent extrusion of the plant roots, is affixed to mutually abutting or overlapping parts of the resin film to prevent the extrusion of the plant roots, and a thickness of the adhesive layer of the cover tape is formed to be smaller than the diameter of the extruding tips of the plant roots, said thickness being approximately 30 microns.

13. The root-preventing sheet layer structure according to claim 11, further comprising:
a resin film reinforcing member interposed directly between the resin film and the adhesive layer of the resin film,
wherein a thickness of the adhesive layer of the resin film is formed to be smaller than the diameter of the extruding tips of the plant roots.

14. The root-preventing layer structure according to claim 13, wherein the reinforcing member is made of at least one of nonwoven fabric, a resin material, a rubber material, and asphalt.

* * * * *